United States Patent
Kawai

(10) Patent No.: US 9,540,496 B2
(45) Date of Patent: Jan. 10, 2017

(54) POLYHYDROXY CURABLE FLUOROELASTOMER COMPOSITION

(71) Applicant: E I DU PONT DE NEMOURS AND COMPANY, Wilmington, DE (US)

(72) Inventor: Tsuyoshi Kawai, Tochigi (JP)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 14/762,572

(22) PCT Filed: Feb. 4, 2014

(86) PCT No.: PCT/US2014/014583
§ 371 (c)(1),
(2) Date: Jul. 22, 2015

(87) PCT Pub. No.: WO2014/123851
PCT Pub. Date: Aug. 14, 2014

(65) Prior Publication Data
US 2015/0361244 A1  Dec. 17, 2015

Related U.S. Application Data

(60) Provisional application No. 61/761,905, filed on Feb. 7, 2013.

(51) Int. Cl.
| | | |
|---|---|---|
| *C08K 3/22* | (2006.01) | |
| *C08K 5/13* | (2006.01) | |
| *C08L 27/22* | (2006.01) | |
| *C08L 27/12* | (2006.01) | |

(52) U.S. Cl.
CPC . *C08K 3/22* (2013.01); *C08K 5/13* (2013.01); *C08L 27/12* (2013.01); *C08L 27/22* (2013.01); *C08K 2003/222* (2013.01); *C08K 2003/2227* (2013.01); *C08K 2201/014* (2013.01)

(58) Field of Classification Search
CPC ............ C08L 27/12–27/20; C08K 2003/222; C08K 2003/2227; C08K 5/13
See application file for complete search history.

(56) References Cited

U.S. PATENT DOCUMENTS

| | | | |
|---|---|---|---|
| 3,876,654 A | 4/1975 | Pattison | |
| 4,250,278 A | 2/1981 | Suzuki et al. | |
| 4,259,463 A | 3/1981 | Moggi et al. | |
| 4,882,390 A | 11/1989 | Kolb | |
| 4,912,171 A * | 3/1990 | Grootaert .............. | C08K 5/0025 525/340 |
| 4,957,975 A * | 9/1990 | Carlson ................... | C08K 3/22 525/326.2 |
| 5,591,804 A | 1/1997 | Coggio et al. | |
| 5,648,429 A * | 7/1997 | Chiodini .............. | C08K 5/0025 525/326.3 |
| 6,887,959 B2 | 5/2005 | Schmiegel et al. | |
| 6,927,259 B2 | 8/2005 | Schmiegel | |
| 7,705,083 B2 | 4/2010 | Stanga et al. | |
| 2002/0002216 A1* | 1/2002 | Tooley ..................... | C08K 9/02 523/210 |
| 2009/0306303 A1* | 12/2009 | Schmiegel ........... | C08K 5/0025 525/326.3 |
| 2011/0294944 A1 | 12/2011 | Manzoni et al. | |
| 2012/0142841 A1 | 6/2012 | Grant | |

FOREIGN PATENT DOCUMENTS

JP      2004051679 A  *  2/2004

OTHER PUBLICATIONS http://multimedia.3m.com/mws/media/104785O/curing-fluoroelastomers.pdf, May 2001.*
http://multimedia.3m.com/mws/media/90599O/fluoroelastomer-fc-2260-data-sheet.pdf, Aug. 2012.*
JP2004051679A, Derwent Ab., Feb. 2004.*
JP2004051679A, Machine Translation, Feb. 2004.*
PCT International Search Report and Written Opinion mailed May 19, 2014.

* cited by examiner

*Primary Examiner* — Satya Sastri

(57) ABSTRACT

The invention disclosed herein is a curable fluoroelastomer composition comprising i) a fluoroelastomer, ii) a polyhydroxy curative and iii) a mixture of anion trappers comprising γ-aluminum oxide hydroxide and magnesium oxide. Cured articles made therefrom are resistant to volume swell in carboxylic acids.

9 Claims, No Drawings

POLYHYDROXY CURABLE FLUOROELASTOMER COMPOSITION

FIELD OF THE INVENTION

This invention relates to curable fluoroelastomer compositions comprising i) a fluoroelastomer, ii) a polyhydroxy curative and iii) a mixture of anion trappers comprising γ-aluminum oxide hydroxide and magnesium oxide.

BACKGROUND OF THE INVENTION

Fluoroelastomers having excellent heat resistance, oil resistance, and chemical resistance have been used widely for sealing materials, containers and hoses. Examples of fluoroelastomers include copolymers comprising units of vinylidene fluoride (VF2) and units of at least one other copolymerizable fluorine-containing monomer such as hexafluoropropylene (HFP), tetrafluoroethylene (TFE), chlorotrifluoroethylene (CTFE), vinyl fluoride (VF), and a fluorovinyl ether such as a perfluoro(alkyl vinyl ether) (PAVE). Specific examples of PAVE include perfluoro(methyl vinyl ether), perfluoro(ethyl vinyl ether) and perfluoro (propyl vinyl ether). Other fluoroelastomers include copolymers comprising units of TFE and units of perfluoro (methyl vinyl ether).

In order to fully develop physical properties such as tensile strength, elongation, and compression set, elastomers must be cured, i.e. vulcanized or crosslinked. In the case of fluoroelastomers, this is generally accomplished by mixing uncured polymer (i.e. fluoroelastomer gum) with a polyfunctional curing agent and heating the resultant mixture, thereby promoting chemical reaction of the curing agent with active sites along the polymer backbone or side chains. Interchain linkages produced as a result of these chemical reactions cause formation of a crosslinked polymer composition having a three-dimensional network structure. Polyhydroxy compounds are commonly employed as curing agents for fluoroelastomers. Such nucleophilic curatives require an acid acceptor (e.g. a divalent metal oxide and/or divalent metal hydroxide) to be activated.

However, cured fluoroelastomer articles containing acid acceptors may exhibit unacceptably high volume swell, that can lead to seal failure, when articles are exposed to carboxylic acids such as acetic acid, despite having excellent resistance to much stronger mineral acids such as sulfuric acid. Exposure to carboxylic acids may occur in various end uses including chemical industry applications and automotive applications such as exhaust gas recirculation (EGR) systems and biofuel management systems.

Volume swell and surface damage of polyhydroxy cured fluoroelastomer articles due to exposure to carboxylic acids may be lessened by reducing the amount, or eliminating, metal oxides and metal hydroxides from the articles. However, the curing rate of such articles is significantly reduced. Thus, there is a need to provide polyhydroxy curable fluoroelastomer compositions that cure rapidly and which still are resistant to volume swell when exposed to carboxylic acids.

SUMMARY OF THE INVENTION

In one aspect, the present invention provides a curable fluoroelastomer composition comprising:
A) a polyhydroxy curable fluoroelastomer;
B) a polyhydroxy curative; and
C) a mixture of anion trappers comprising γ-aluminum oxide hydroxide and magnesium oxide.

In another aspect, the present invention provides a polyhydroxy cured fluoroelastomer article comprising:

A) a fluoroelastomer; and
B) a mixture of anion trappers comprising γ-aluminum oxide hydroxide and magnesium oxide.

DETAILED DESCRIPTION OF THE INVENTION

The present invention is directed to curable fluoroelastomer compositions that, when cured with a polyhydroxy curative, have reduced volume swell in carboxylic acids (such as in motor vehicle blow-by gas condensates or exhaust gas condensates) and in coolants and biofuel. Such cured fluoroelastomer articles have surprisingly low volume swell, i.e. less than 10 vol. %, preferably less than 5 vol. %, when exposed to an acid condensate of sulfuric acid/nitric acid/acetic acid/formic acid in the ratio of 2500 ppm/50 ppm/10 ppm/1000 ppm/300 ppm at 60° C. for 336 hours. The cured fluoroelastomer compositions have a variety of end uses, including chemical industry applications and automotive applications such as exhaust gas recirculation (EGR) systems and biofuel management systems.

Fluoroelastomers that are suitable for use in this invention are those that are polyhydroxy curable. By "polyhydroxy curable" is meant fluoroelastomers which are known to crosslink with polyhydroxy curatives such as bisphenol AF. Such fluoroelastomers include those having a plurality of carbon-carbon double bonds along the main elastomer polymer chain and also fluoroelastomers which contain sites that may be readily dehydrofluorinated. The latter fluoroelastomers include, but are not limited to those which contain adjacent copolymerized units of vinylidene fluoride ($VF_2$) and hexafluoropropylene (HFP) as well as fluoroelastomers which contain adjacent copolymerized units of $VF_2$ (or tetrafluoroethylene) and a fluorinated comonomer having an acidic hydrogen atom such as 2-hydropentafluoropropylene; 1-hydropentafluoropropylene; trifluoroethylene; 2,3,3,3-tetrafluoropropene; or 3,3,3-trifluoropropene. Preferred polyhydroxy curable fluoroelastomers include the copolymers of i) vinylidene fluoride with hexafluoropropylene and, optionally, tetrafluoroethylene (TFE); ii) vinylidene fluoride with a perfluoro(alkyl vinyl ether) such as perfluoro(methyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro(methyl vinyl ether) and 3,3,3-trifluoropropylene.

In addition to the fluoroelastomer, polyhydroxy curable compositions of this invention contain a polyhydroxy curative and optionally a vulcanization (or curing) accelerator. The curable compositions contain 0.4 to 4 parts by weight (preferably 1 to 2.5 parts) of polyhydroxy curing agent (or a derivative thereof) per 100 parts by weight fluoroelastomer, i.e. 0.4-4 phr (preferably 1-2.5 phr). Typical polyhydroxy cross-linking agents include di-, tri-, and tetrahydroxybenzenes, naphthalenes, and anthracenes, and bisphenols of the formula

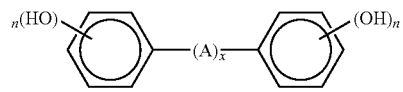

where A is a difunctional aliphatic, cycloaliphatic, or aromatic radical of 1-13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxybenzene) (i.e. bisphenol AF or BPAF); 4,4'-isopropylidene diphenol (i.e. bisphenol A); 4,4'-dihydroxydiphenyl sulfone; and diaminobisphenol AF. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methylphenylene, dimethylphenylene, 1,4-naphthylene, 3-fluoro-1,4-naphthylene, and 2,6-naphthylene. Polyhydroxyphenols of the formula

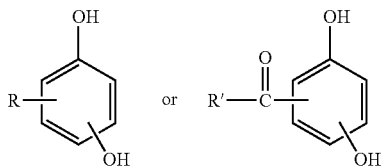

where R is H or an alkyl group having 1-4 carbon atoms or an aryl group containing 6-10 carbon atoms and R' is an alkyl group containing 1-4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions, tertiary sulfonium salts of bisphenol anions and quaternary phosphonium salts of bisphenol anions. Specific examples include the disodium salt of bisphenol AF, the dipotassium salt of bisphenol AF, the monosodium monopotassium salt of bisphenol AF and the benzyltriphenylphosphonium salt of bisphenol AF.

Quaternary ammonium and phosphonium salts of bisphenol anions are discussed in U.S. Pat. Nos. 4,957,975 and 5,648,429. Bisphenol AF salts (1:1 molar ratio) with quaternary ammonium ions of the formula $R_1R_2R_3R_4N^+$, wherein $R_1$-$R_4$ are $C_1$-$C_8$ alkyl groups and at least three of $R_1$-$R_4$ are $C_3$ or $C_4$ alkyl groups are preferred. Specific examples of these preferred compositions include the 1:1 molar ratio salts of tetrapropyl ammonium-, methyltributylammonium- and tetrabutylammonium bisphenol AF. Such salts may be made by a variety of methods. For instance a methanolic solution of bisphenol AF may be mixed with a methanolic solution of a quaternary ammonium salt, the pH is then raised with sodium methoxide, causing an inorganic sodium salt to precipitate. After filtration, the tetraalkylammonium/BPAF salt may be isolated from solution by evaporation of the methanol. Alternatively, a methanolic solution of tetraalkylammonium hydroxide may be employed in place of the solution of quaternary ammonium salt, thus eliminating the precipitation of an inorganic salt and the need for its removal prior to evaporation of the solution.

In addition, derivatized polyhydroxy compounds such as mono-or diesters, and trimethylsilyl ethers are useful crosslinking agents. Examples of such compositions include, but are not limited to resorcinol monobenzoate, the diacetate of bisphenol AF, the diacetate of sulfonyl diphenol, and the diacetate of hydroquinone.

Vulcanization accelerators (also referred to as cure accelerators) which may be used in the curable fluoroelastomer compositions include tertiary sulfonium salts such as $[(C_6H_5)_2S^+(C_6H_{13})][Cl]^-$, and $[(C_6H_{13})_2S(C_6H_5)]^+$ $[CH_3CO_2]^-$ and quaternary ammonium, phosphonium, arsonium, and stibonium salts of the formula $R_5R_6R_7R_8Y^+$ $X^-$, where Y is phosphorous, nitrogen, arsenic, or antimony; $R_5$, $R_6$, $R_7$, and $R_8$ are individually $C_1$-$C_{20}$ alkyl, aryl, aralkyl, alkenyl, and the chlorine, fluorine, bromine, cyano, -OR, and -COOR substituted analogs thereof, with R being $C_1$-$C_{20}$ alkyl, aryl, aralkyl, alkenyl, and where X is halide, hydroxide, sulfate, sulfite, carbonate, pentachlorothiophenolate, tetrafluoroborate, hexafluorosilicate, hexafluorophosphate, dimethyl phosphate, and $C_1$-$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, tributylallylphosphonium chloride, tributyl-2-methoxypropylphosphonium chloride, 1,8-diazabicyclo [5.4.0]undec-7-ene, and benzyldiphenyl(dimethylamino) phosphonium chloride. Other useful accelerators include methyltrioctylammonium chloride, methyltributylammonium chloride, tetrapropylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenylphosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654. The amount of accelerator used is between 0.05 and 2 parts by weight per hundred parts by weight fluoroelastomer (i.e. 0.05-2 phr). Preferably, 0.1 to 1.0 parts accelerator per hundred parts fluoroelastomer is used.

The curable compositions of the invention also contain 1 to 25 parts by weight, preferably 2 to 15 parts by weight, of a mixture of anion rappers comprising γ-aluminum oxide hydroxide (i.e. Boehmite) and magnesium oxide, per 100 parts by weight of fluoroelastomer. The amount of γ-aluminum oxide hydroxide in the mixture of anion trappers ranges between 0.75 and 20 parts by weight, preferably 1.5 to 10 parts by weight, per hundred parts by weight fluoroelastomer.

In this mixture of anion trappers, the magnesium oxide acts both as an acid acceptor in order to facilitate the curing (crosslinking) reaction and also as an anion trapper for scavenging any acidic substances such as HF or carboxylic acids. The γ-aluminum oxide hydroxide acts as an anion trapper for scavenging any acidic substance, preferably carboxylic acids, but does not significantly impact the fluoroelastomer cure rate. Suitable γ-aluminum oxide hydroxide compounds include, but are not limited to those of the formula AlO(OH) and having an average particle size of about 20 microns, BET specific surface area of about 270 $m^2/g$, and average pore size of about 4.5 nm. Such compounds are available commercially from Nippon Light Metal Company Ltd. as C10W.

The fluoroelastomer, curative, anion trappers and any other ingredients (e.g. fillers, process aids, colorants, etc. commonly employed in fluoroelastomer compositions) are generally incorporated into a curable composition by means of an internal mixer or rubber mill.

The resulting composition may then be shaped (e.g. molded or extruded) and cured to form a fluororubber article. Curing typically takes place at about 150°-200° C. for 1 to 60 minutes. Conventional rubber curing presses, molds, extruders, and the like provided with suitable heating and curing means can be used. Also, for optimum physical properties and dimensional stability, it is preferred to carry out a post curing operation wherein the molded or extruded fluororubber article is heated in an oven or the like for an additional period of about 1-48 hours, typically from about 180°-275° C., generally in an air atmosphere.

Another aspect of the present invention is a cured fluoroelastomer article made from the above-described curable composition. Such fluoroelastomer articles have reduced volume swell, i.e. less than 10 vol. %, preferably less than 5 vol. %, when exposed to an acid condensate of sulfuric acid/nitric acid/acetic acid/formic acid in the ratio of 2500 ppm/50 ppm/10 ppm/1000 ppm/300 ppm at 60° C. for 336 hours. The cured fluoroelastomer articles have a variety of end uses, including chemical industry applications and automotive applications such as exhaust gas recirculation (EGR) systems and biofuel management systems.

EXAMPLES

Test Methods

Volume Swell (%) after immersion in an acid condensate of sulfuric acid/nitric acid/acetic acid/formic acid in the ratio of 2500 ppm/50 ppm/10 ppm/1000 ppm/300 ppm at 60° C. was determined by ASTM D471-96 on standard ASTM D471 coupons. The coupons were prepared from cured fluoroelastomer slabs and immersed in acid condensate in a sealed Parr vessel at 60° C. for the times noted in the Examples.

Moving Die Rheometric (MDR) studies of cure rate and cure level were carried out at a temperature of 177° C. for 12 minutes at an arc of 0.5° following JIS K 6300-2:2001.

Mechanical properties were measured at 25° C. following JIS K 6251:2004.

Compression set was measured following JIS K 6262:2006 at 200° C., 70 hours, large pellet.

Materials

Fluoroelastomer FKM1 employed in the examples was Viton® AL-600, a copolymer of vinylidene fluoride, hexafluoropropylene and tetrafluoroethylene, available from DuPont.

Curing agent used was VC50, a mixture of bisphenol AF and a quaternary phosphonium salt, available from DuPont.

γ-aluminum oxide hydroxide used was Boehmite C10W, available from Nippon Light Metal Company Ltd.

Carbon black employed was MT grade carbon black, available from Asahi Carbon Company Limited.

Ricebran wax process aid used was VPA#2, available from DuPont.

Magnesium oxide used was MgO#150, available from Kyowa Chemical.

Calcium hydroxide used was from Ohmi Chemical.

The invention is further illustrated by, but is not limited to, the following examples.

Example 1 and Comparative Examples 1-4

Curable compositions for Example 1 (E1) and Comparative Examples 1-4 (CE1-CE4) were made by compounding the ingredients in a laboratory internal mixer and sheet off mill. Formulations are shown in Table I.

The compositions were molded into slabs (for volume swell testing) and pellets and press cured at 177° C. for 10 minutes.

Coupons made from cured slabs were exposed to an acid condensate mixture of sulfuric acid/nitric acid/acetic acid/formic acid in the ratio of 2500 ppm/250 ppm/10 ppm/1000 ppm/300 ppm at 60° C. for the indicated time. Results are shown in Table I.

TABLE I

| | E1 | CE1 | CE2 | CE3 | CE4 |
|---|---|---|---|---|---|
| Ingredient, phr[1] | | | | | |
| FKM1 | 100 | 100 | 100 | 100 | 100 |
| MgO | 3 | 3 | 3 | 0 | 0 |
| Ca(OH)$_2$ | 0 | 6 | 0 | 6 | 0 |
| Boehmite C10W | 5 | 0 | 0 | 0 | 15 |
| Carbon black, MT | 30 | 30 | 30 | 30 | 30 |
| Curing agent, VC50 | 2.5 | 2.5 | 2.5 | 2.5 | 2.5 |
| Processing Aids, VPA #2 | 0.5 | 0.5 | 0.5 | 0.5 | 0.5 |
| % Volume swell in acid condensate | | | | | |
| 168 hours | 4.9 | 9.2 | 4.6 | 3.4 | NA |
| 336 hours | 7.4 | 16.9 | 6.4 | 4.8 | NA |
| MDR results | | | | | |
| ML, dN · m | 1.9 | 1.8 | 1.7 | 1.6 | 1.5 |
| MH, dN · m | 24.6 | 26.2 | 22.7 | 24.6 | 4.4 |
| Ts2, min. | 0.8 | 1.4 | 2.0 | 1.8 | 6.6 |
| Tc50, min. | 1.0 | 1.9 | 3.4 | 2.7 | 4.0 |
| Tc90, min. | 1.7 | 3.0 | 6.4 | 4.6 | 10.1 |
| Mechanical Properties | | | | | |
| Tensile strength, MPa | 15 | 17 | 17 | 13 | NA |
| Elongation at break, % | 210 | 210 | 220 | 200 | NA |
| Compression set | | | | | |
| % | 18 | 19 | 18 | 19 | NA |

[1]parts by weight per hundred parts rubber (i.e. fluoroelastomer)

The composition of the invention (E1), containing both MgO and boehmite, exhibited an optimal balance of low volume swelling in acid condensate, rapid cure rate (as measured by Tc90, the time to reach 90% of maximum torque) and curing level (maximum torque, MH). Comparative Examples CE1 to CE4 suffered from either high volume swell, slow cure rate or low curing level.

What is claimed is:

1. A curable fluoroelastomer composition comprising:
   A) a polyhydroxy curable fluoroelastomer;
   B) a polyhydroxy curative; and
   C) a mixture of anion trappers comprising γ-aluminum oxide hydroxide and magnesium oxide.

2. The curable fluoroelastomer composition of claim 1 wherein said polyhydroxy curable fluoroelastomer is selected from the group consisting of copolymers of i) vinylidene fluoride with hexafluoropropylene and, optionally, tetrafluoroethylene; ii) vinylidene fluoride with a perfluoro(alkyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro(methyl vinyl ether) and 3,3,3-trifluoropropylene.

3. The curable fluoroelastomer composition of claim 1 wherein said mixture of anion trappers is present in an amount between 1 and 25 parts by weight per hundred parts by weight fluoroelastomer.

4. The curable fluoroelastomer composition of claim 3 wherein said mixture of anion trappers comprises 0.75 to 20 parts by weight γ-aluminum oxide hydroxide, per hundred parts by weight fluoroelastomer.

5. A polyhydroxy cured fluoroelastomer article comprising:
   A) a fluoroelastomer; and
   B) a mixture of anion trappers comprising y-aluminum oxide hydroxide and magnesium oxide.

6. The polyhydroxy cured fluoroelastomer article of claim 5 wherein said mixture of anion trappers is present in an amount between 1 and 25 parts by weight per hundred parts by weight fluoroelastomer.

7. The polyhydroxy cured fluoroelastomer article of claim 6 wherein said mixture of anion trappers comprises 0.75 to 20 parts by weight γ-aluminum oxide hydroxide, per hundred parts by weight fluoroelastomer.

8. The polyhydroxy cured fluoroelastomer article of claim 5 wherein said fluoroelastomer is selected from the group consisting of copolymers of i) vinylidene fluoride with hexafluoropropylene and, optionally, tetrafluoroethylene; ii) vinylidene fluoride with a perfluoro(alkyl vinyl ether), 2-hydropentafluoropropylene and optionally, tetrafluoroethylene; iii) tetrafluoroethylene with propylene and 3,3,3-trifluoropropene; iv) tetrafluoroethylene, perfluoro(methyl vinyl ether) and hexafluoro-2-(pentafluorophenoxy)-1-(trifluorovinyloxy) propane, and v) ethylene with tetrafluoroethylene, perfluoro(methyl vinyl ether) and 3,3,3-trifluoropropylene.

9. The polyhydroxy cured fluoroelastomer article of claim 5 wherein said article has a volume swell less than 10 vol % after exposure to an acid condensate of sulfuric acid/nitric acid/acetic acid/formic acid in the ratio of 2500ppm/50ppm/10ppm/1000ppm/300ppm at 60° C. for 336 hours.

* * * * *